United States Patent [19]

Nylund et al.

[11] Patent Number: 5,324,590
[45] Date of Patent: Jun. 28, 1994

[54] FOAMED ADHESIVE FOR PARTICLEBOARD

[75] Inventors: Sven J. Nylund, Lake Grove; Boyd H. Hansen; Thomas L. Demaree, both of Portland, Oreg.; Robert L. Rhoden, Camas, Wash.

[73] Assignees: Pacific Adhesives Co., Inc.; Spare Parts Manufacturers, Inc., both of Portland, Oreg.

[21] Appl. No.: 10,542

[22] Filed: Jan. 28, 1993

[51] Int. Cl.$^5$ ............... B32B 27/42; B32B 23/08; C08G 12/12; C08K 3/34
[52] U.S. Cl. ............... 428/524; 428/526; 428/528; 521/102; 521/84.1; 524/21; 156/62.2
[58] Field of Search ............... 428/524, 526, 528; 521/102, 187, 188, 84.1; 524/456, 21

[56] References Cited

U.S. PATENT DOCUMENTS

| | | | |
|---|---|---|---|
| 2,323,831 | 7/1943 | Menger et al. | 144/309 |
| 3,615,975 | 10/1971 | Gillern et al. | 428/317.5 |
| 3,895,984 | 7/1975 | Cone et al. | 156/79 |
| 3,905,921 | 9/1975 | Cone et al. | 260/2.5 F |
| 3,965,860 | 6/1976 | Cone et al. | 118/612 |
| 4,115,178 | 9/1978 | Cone et al. | 156/291 |
| 4,258,088 | 3/1981 | Cone et al. | 427/316 |
| 4,457,978 | 7/1984 | Wawzonek | 428/528 |
| 5,057,591 | 10/1991 | Detlefsen et al. | 428/528 |

OTHER PUBLICATIONS

"Bonding Particleboard With Foamed Adhesives", by Allan Watters and J. D. Wellons, Forest Products Journal, vol. 28, No. 2, Feb. 1978, pp. 43–48.

"Foamed Adhesives For Particleboard", by Terry Sellers, Jr., Technical Note, Forest Products Journal, vol. 38, No. 11/12 Nov./Dec. 1988, pp. 55–56.

*Primary Examiner*—George F. Lesmes
*Assistant Examiner*—Kathryne E. Shelborne
*Attorney, Agent, or Firm*—Olson & Olson

[57] ABSTRACT

Particleboard is produced by coating the particles of wood furnish with an adhesive comprising a foamed mixture of 96–98 percent by weight urea formaldehyde and 2–4 percent by weight dried animal blood, the mixture being foamed to about 5–15 times the volume of the liquid resin to provide a urea formaldehyde resin solids content of 45–70 percent by weight. The foamed adhesive mixture is coated onto the wood particles of the furnish, as by means of a blender, to provide the finished particleboard with a resin solids content of 5–10 percent by weight.

8 Claims, No Drawings

FOAMED ADHESIVE FOR PARTICLEBOARD

BACKGROUND OF THE INVENTION

This invention relates to particleboard, and more particularly to a novel foamed adhesive for use in the manufacture o particleboard.

The manufacture of particleboard heretofore has employed liquid or spray adhesive resins mixed with wood particles in a commercial blender. Because of the characteristics of commercial blenders, the resin is distributed over the wood particles quite inefficiently. Accordingly, the excessive amount of resin required to achieve adequate distribution over the wood particles for acceptable internal bond (IB) strength, modulus of rupture (MOR) and modulus of elasticity (MOE) reflects adversely on cost of production.

Investigation was made (Bonding Particleboard With Foaming Adhesives, by Alan Watters and J. D. Wellons, Forest Products Journal, Vol. 28, No. 2, February 1978) into the utilization of resin foam with the view to improve distribution over the surfaces of wood particles and thus achieve acceptable IB and MOR properties at lower production cost. This laboratory investigation utilized urea formaldehyde resin foamed with Freon 12 to 85 times the volume of the liquid resin, and concluded that the method employed in generating foams is not possible on an industrial scale.

Investigation into the use of foamed adhesives for particleboard also was made by Terry Sellers, Jr., and reported in his Technical Note entitled "Foamed Adhesives for Particleboard" published in Forest Products Journal, Vol. 38, No. 11/12, November/December 1988, pages 55 and 56.

This limited investigation utilized urea formaldehyde resin mixed with bodying agents and surfactants and foamed to four times the volume of the "neat" liquid resin that was used as a control and sprayed onto the furnish. The investigation found that IB and MOR properties were similar to liquid resin application at similar resin solids contents, and hence the resin costs were also about the same.

Thus, while resin foam has long been utilized successfully in the efficient production of plywood, as exemplified in U.S. Pat. Nos. 3,895,984; 3,905,931; 3,965,860; 4,115,178; and 4,258,088 such resin foams heretofore have not been employed in the commercial manufacture of particleboard.

SUMMARY OF THE INVENTION

This invention provides for the large scale manufacture of particleboard by coating the particles of wood with an adhesive comprising a foamed mixture, in percent by weight, of an aqueous alkaline solution of 96–98 percent urea formaldehyde and 2–4 percent dried animal blood. At an expansion of between 5 and 15 times the volume of the liquid resin, the foam has a resin solids content of 45–70 percent, a viscosity range of 200–1500 centipoises and a density range of about 0.10–0.25 g/cc. This foamed mixture provides a particleboard in which the resin content may range between 5 and 10 percent by weight and the density of the board may range between 40 and 50 pounds per cubic foot, while the physical strength properties exceed those of conventional particleboards utilizing substantially greater percentages by weight of liquid or spray resins.

It is the principal objective of this invention to provide a foamed adhesive by which to produce particleboard of superior physical properties with significantly less resin content than has been required heretofore.

Another objective of this invention is the provision of a foamed adhesive incorporating animal blood which functions as a foaming agent, an adhesive and a scavenger for formaldehyde.

Still another objective of this invention is the provision of a foamed adhesive which provides a superior particleboard at less cost of production than conventional liquid or spray adhesives.

A further objective of this invention is to provide superior particleboard incorporating the novel foamed adhesive of this invention.

The foregoing and other objects and advantages of this invention will appear from the following detailed description of a preferred embodiment.

DESCRIPTION OF THE PREFERRED EMBODIMENT

Urea formaldehyde glues have been used for some time in the manufacture of plywood and particleboard. However, there are substantial differences between them, as shown in Table I, wherein all proportions are in percent by weight.

TABLE I

|  | PLYWOOD | | PARTICLEBOARD | | | | | |
|---|---|---|---|---|---|---|---|---|
|  | Liquid | Foam | Liquid Control Face/Core | | Foam I | Foam II | Foam III Face/Core | |
| UF Resin Solids Content |  |  |  |  |  |  |  |  |
| 66% |  |  |  |  | 97.1 |  |  |  |
| 65% |  |  | 100 |  |  | 83.06 | 97.5 |  |
| 62% |  |  |  | 100 |  |  |  | 97.5 |
| 60% | 48.42 | 48.42 |  |  |  |  |  |  |
| Water | 20.8 | 29.6 |  |  |  | 8.31 |  |  |
| Wheat Flour | 27.1 | 15.8 |  |  |  | 8.31 |  |  |
| Animal Blood |  | 2.7 |  |  |  |  | 2.5 | 2.5 |
| Liquid Catalyst | 3.4 | 3.4 |  |  |  |  |  |  |
| Sodium 2-ethyl-1 Hexyl Sulfate |  |  |  |  |  | 0.33 |  |  |
| Freon 12 ($CF_2Cl_2$) |  |  |  |  | 2.9 |  |  |  |
| Antifoam | 0.2 |  |  |  |  |  |  |  |
| TOTAL MIX | 99.92 | 99.92 | 100 | 100 | 100 | 100 | 100 | 100 |
| % Resin Solids to Mix | 29.05 | 29.05 | 65 | 62 | 64.09 | 54.0 | 63.38 | 60.45 |

TABLE I-continued

| | PLYWOOD | | PARTICLEBOARD | | | | | |
| | | | Liquid Control | | Foam | Foam | Foam III | |
| | Liquid | Foam | Face/Core | | I | II | Face/Core | |
| --- | --- | --- | --- | --- | --- | --- | --- | --- |
| Viscosity in Centipoises | 4000–5000 | 1200 | 350 | 350 | 350 | 530 | 1000 | 1000 |
| Density g/cc | 1.28 | .175 | 1.28 | 1.28 | .015 | .29 | .175 | .175 |

As shown in the Table, in plywood a liquid urea formaldehyde having a resin solids content of 60% by weight was formulated into a liquid glue that was applied to veneers of wood by spreaders. The glue has a density of about 1.28 g/cc and a viscosity of at least about 4,000–5,000 centipoises. In formulating the glue, the urea formaldyhyde resin was extended with about 20% by weight water and about 27% by weight wheat flour, providing a glue resin content of about 48% by weight and a resins solids content of about 29% by weight.

A foamed urea formaldehyde glue having the same resin content and resin solids content, by extension with about 30% by weight water, about 16% by weight wheat flour and about 2.7% by weight dried animal blood as a foaming agent, was deposited onto the surfaces of plywood veneers at a density of about 0.175 g/cc and a viscosity of about 1,200 centipoises.

In particleboard, urea formaldehyde glue conventionally is applied by spray or liquid at a viscosity of about 350 centipoises. Table I shows a liquid urea formaldehyde control glue in which the urea formaldehyde has a resin solids content of 65% by weight for face furnish and 62% by weight for core furnish. The resin is applied "neat", and therefore the resin solids content of the glue is 65% by weight for face furnish and 62% by weight for core furnish. This liquid resin was applied to wood particles in a blender that rubs or smears the resin onto the particles.

Table I also shows, as Foam I, the urea formaldehyde foamed glue of the Watters and Wellons investigation discussed hereinbefore. The experiment was conducted on a single furnish, rather than on face and/or core furnish. The urea formaldehyde resin was foamed with Freon 12 ($CF_2Cl_2$) gas with an adhesive emulsifier mixture to an expansion of 85 times the volume of the liquid resin which had a density of 0.015 g/cc.

The foamed glue disclosed in the Sellers' Technical Note previously discussed also is shown in Table I, as Foam II. This glue incorporated water, wheat flour extender and sodium 2-ethyl-1 hexyl sulfate surfactant and was foamed to four times the volume of the liquid resin and a density of 0.29 g/cc.

Table I also illustrates, as Foam III, a foamed urea formaldehyde resin formulation made in accordance with this invention. Urea formaldehyde resins having 65% resin solids for face furnish and 62% resin solids for core furnish were mixed with 2.5% by weight dried animal blood as a foaming agent. Conventional foaming equipment was employed to produce a foam that was about 7 times the volume of the liquid resin. This yielded foamed glues having a urea formaldehyde resin solids content between 60–63% by weight, a viscosity of about 1000 centipoises and a density of 0.75 g/cc.

It will be understood by those skilled in the art that the disclosed range of viscosities of 200–1500 centipoises is the viscosity range of the liquid resin mixture just before foaming. The density range of 0.10–0.25 g/cc is achieved by subjecting the liquid resin mixture having the viscosity range of 200–1500 centipoises to the action of conventional foaming equipment. The produced foam has the stated density range and the resin solids content of 45–70 percent by weight, and is a very effective foamed adhesive for the production of particle board.

Urea formaldehyde resin is commercially available from several sources. Typical of these are the urea formaldehyde resins available from Borden as F48BC for the 65% face furnish resin and C29BC for the 62% core furnish resin. The successful use of blood as a foaming agent for urea formaldehyde resins appears to be its replacement of the surfactants normally used for this purpose. Surfactants do not have bonding capability and the foam is of poor quality and not very stable. Attempts to reproduce the foam disclosed in the Sellers'. Technical Note demonstrated these adverse characteristics, and the limited degree of expansion to 3–4 times the volume of the liquid produced an unstable foam that has a tendency to dive into the wood and over-penetrate.

The use of blood as a foaming agent and as an adhesive also provides the beneficial quality of scavenging some of the free formaldehyde that exists in urea formaldehyde glues.

Foaming the urea formaldehyde resin to between 5 and 15 times the volume of the liquid provides optimum distribution and utilization of the resin in the blending of the resin into the furnish, in that it affords more uniform coverage of glue to the individual wood particles of the furnish. Less than about 5 times expansion contributes to over-penetration of the wood and more than 15 times expansion is beyond the current requirement.

Foam resin of this invention is easily spread by rubbing type blenders. The physical results were duplicated in both laboratory and commercial type blenders. In this regard, experiments conducted both in the laboratory and in commercial plant operation show a distribution of the resin over the surfaces of the particles of furnish that contributes to better physical properties of IB, MOR, MOE and MST (Minnesota Shear test, similar to IB), even though the resin amount was reduced substantially.

Although the tests reported herein are of test panels made in a commercial mill using a caulless system, it will be understood that equal success is achieved when using caul plates.

Table II shows the strength characteristics of a number of ⅝ inch industrial particleboards produced with the use of the foamed urea formaldehyde resins of this invention, in different concentrations of resin solids in the finished board. The furnish had a high percentage of fines (sander dust) which required more resin in the plant application. The commercial plant uses a caulless system. The derived densities of the test boards, in pounds per cubic foot, were normalized to 46.5 pounds per cubic foot.

TABLE II

| Number of Panels | Application Method | % Resin Face | Solids Core | IB (psi) | MST (psi) | MOR (psi) | MOE (psi) |
|---|---|---|---|---|---|---|---|
| 3 | Liquid Control | 10.41 | 10.0 | 99.0 | 98.6 | 1529 | 274,000 |
| 2 | FOAM-1 | 9.3 | 8.45 | 111.3 | 101.8 | 2095 | 334,500 |
| 2 | FOAM-2 | 8.45 | 7.66 | 102.6 | 106.9 | 1711 | 348,000 |
| 1 | FOAM-3 | 7.56 | 6.85 | 93.6 | 98.0 | 1927 | 320,000 |
| 2 | Sprayed Control | 10.41 | 10.0 | 104.1 | 101.2 | 1994 | 315,000 |
| 1 | Mill Liquid | 11.0 | 10.5 | 102.7 | | | |

Table 2 shows the number of particleboard panels prepared for test and the method of application of the urea formaldehyde resin. The Liquid Control is the same as in Table I. Two additional controls also are shown, one of liquid spray and the other of a mill liquid application on a ⅝ inch particleboard.

The foam applications are of different percent resin solids in an oven dry furnish for face and core layers. The strength values of IB, MST, MOR and MOE are determined by recognized standard testing procedures of the ASTM, and are normalized to a uniform density of 46.5 pounds per cubic foot. The MST values were divided by 25 in order to obtain a comparison with the IB values. Two test samples were taken from the opposite ends of each board and the test readings averaged.

It is to be observed from Table II that a reduction of resin from 10.41 percent to 9.3 percent in the face furnish is a 10.67 percent reduction of resin. A 15.5 percent resin reduction in the core furnish is achieved by reducing the resin from 10.0 percent to 8.45 percent. The IB values of the boards made with foamed resins were 11.09 percent better than the liquid controls. The MST bonds also were improved by 3.3 percent.

A further reduction of resin from 10.41 to 8.45 percent in the face furnish is a reduction of 18.8 percent, and the reduction in the core furnish from 10 percent to 7.66 percent is a reduction of 23.4 percent resin. The IB values are still better than the controls by about 3.5 percent, and the MST bonds were 7.8 percent better.

A still further reduction of resin from 10.41 percent to 7.56 percent in the face is a reduction of resin of 27.38 percent, and the reduction in the core furnish from 10 percent to 6.85 percent is a 31.5 percent reduction of resin. Although the IB values were only slightly lower than the controls, by about 5.4 percent, the MST values were quite comparable.

Table II demonstrates that the spray application of resin is better than the liquid application. However, a reduction of 10.67 percent resin solids by using a foamed resin produced about equal results in MOR and was 5.8 percent better in MOE. A reduction of 18.8 percent resin using foamed glue showed a decrease of 14.2 percent in MOR, compared with the spray application. The MOE was better for the foamed glue than the spray by some 9.5 percent.

From Table II it is apparent that substantially equal IB or MST values are achieved with a liquid control resin and the foamed resins of this invention, while obtaining a significant reduction of about 25 percent resin with the foam application.

To illustrate the significance of cost savings by the replacement of liquid or spray urea formaldyhyde resin glue with the foamed urea formaldehyde resin glue of this invention, the present cost of urea formaldehyde liquid resin glue for the manufacture of 200 million sq. ft. of ⅝ inch particleboard, in a plant that uses a high percentage of fines as furnish and has a caulless system, is about $8,000,000.00. By comparing the liquid control and Foam-1 in Table II, discussed hereinbefore, the average reduction of about 12 percent in resin usage results in a cost saving of about $980,000.00 while achieving significantly increased IB, MOR and MOE strength properties. When comparing the liquid control and Foam-3 in Table II, the cost savings of approximately 30 percent exceeds $2,350,000.00, with insignificantly less IB strength values.

Although this description is directed to the manufacture of conventional particleboard, the foamed adhesive of this invention may be used with equal advantage in the manufacture of composition boards such as MDF (Medium Density Fiberboard), oriented strandboard and others. Accordingly, the term "particleboard" as employed herein and in the claims is intended to include such composition boards.

It will be apparent to those skilled in the art that various changes may be made in the types and proportions of components and the method of formulation thereof. For example, slight amounts of water may be added to the mixture of urea formaldehyde resin and dried, powdered animal blood. It is preferred, however, to utilize the moisture content of the furnish, since it enhances uniform distribution of the resin over the surfaces of the wood particles making up the furnish. Other changes also may be made, as desired, without departing from the spirit of this invention and the scope of the appended claims.

We claim:

1. A foamed adhesive for particleboard, consisting essentially of a foamed mixture of an aqueous alkaline solution of 96–98 percent by weight urea formaldehyde resin and 2–4 percent by weight dried animal blood, the solution 14 having a viscosity range of 200–1500 centipoises and being foamed to 5–15 times the volume of the liquid mixture, whereby to provide a foam having a resin solids content of 45–70 percent by weight and a density range of about 0.10–0.25 g/cc.

2. The foamed adhesive of claim 1 wherein the mixture is foamed to about 7 times the volume of the liquid mixture.

3. A particleboard incorporating a foamed adhesive consisting essentially of a foamed mixture of an aqueous alkaline solution of 96–98 percent by weight urea formaldehyde resin and 2–4 percent by weight dried animal blood, the solution having a viscosity range of 200–1500 centipoises and being foamed to 5–15 times the volume of the liquid mixture, thereby providing a foam having a resin solids content of 45–70 percent by weight and a density range of about 0.10–0.25 g/cc, the urea formaldehyde resin solids content being 5–10 percent by weight of the particleboard.

4. The particleboard of claim 2 wherein the adhesive mixture is foamed to about 7 times the volume of the liquid mixture.

5. The particleboard of claim 3 wherein the urea formaldehyde resin solids content is about 8 percent by weight of the particleboard.

6. The particleboard of claim 2 wherein the urea formaldehyde resin solids content is about 9 percent by weight in the face furnish and about 8.5 percent by weight in the core furnish.

7. The particleboard of claim 2 wherein the urea formaldehyde resin solids content is about 8.5 percent by weight in the face furnish and about 7.7 percent by weight in the core furnish.

8. The particleboard of claim 2 wherein the urea formaldehyde resin solids content is about 7.5 percent by weight in the face furnish and about 7 percent by weight in the core furnish.

* * * * *

UNITED STATES PATENT AND TRADEMARK OFFICE
CERTIFICATE OF CORRECTION

PATENT NO. : 5,324,590
DATED : June 28, 1994
INVENTOR(S) : Sven J. Nylund, et al It is certified that error appears in the above-identified patent and that said Letters Patent is hereby corrected as shown below:

Column 1, line 7, "o" should read --of--.
" 2, " 33, after "provide" insert: --a--.
" 3, " 62, "0.75" should read --0.175--.
" 4, " 28, delete the period (.) after --ers'--.
" 6, " 33, delete "14".

Signed and Sealed this

Fourth Day of October, 1994

Attest:

BRUCE LEHMAN

Attesting Officer

Commissioner of Patents and Trademarks